Patented Mar. 2, 1954

2,671,075

UNITED STATES PATENT OFFICE 2,671,075

FINE CRUMB RUBBERLIKE POLYMERIZATES AND METHODS FOR THEIR PRODUCTION

Charles Henry Hempel, Manitowoc, Wis., assignor to Heresite & Chemical Company, a corporation of Wisconsin No Drawing. Application November 30, 1949, Serial No. 130,368

7 Claims. (Cl. 260—83.3)

This invention relates to a fine-crumb polymerizate of butadiene and material copolymerizable therewith of a class consisting of styrene and acrylonitrile and to the method for producing the same.

This application is a continuation-in-part of my abandoned application 519,200, filed January 19, 1944, and entitled "Coagulation, Neutralization and Washing of Rubber-Like Polymerizates."

The ordinary methods for producing copolymerizates of styrene and butadiene or acrylonitrile and butadiene result in a limited yield requiring the recovery of the individual reactants, which is an expensive procedure, particularly in the case of butadiene. According to this invention, it is possible to procure 95 to 100% coagulation into a fine-crumb polymerizate. In the present process a soapy emulsion of butadiene and styrene or butadiene and acrylonitrile is produced by combining these reactants with the necessary amount of soap to form the emulsion, and in addition thereto, adding 1% to 1.5% of a wetting agent. The invention may be used in the production of rubber of the type described in the patent issued to me on April 14, 1949, as Patent No. 2,463,382.

The purpose of this invention is to produce a dry polymer and to regulate the crumb size of the copolymerizate by the addition of a wetting agent to the soapy emulsion of the raw materials. The purpose in achieving a fine-crumb size is to obtain a rubber product which is easier to wash completely, neutralize, dry and mill. It is desirable that the final crumbs have a diameter of .5 mm. to 3 mm. I do not seek to regulate the particle size of the copolymerizate but rather the crumb size which is made up of a plurality of particles of the copolymerizate.

The mere addition of soap in excess of the amount necessary to form the original soapy emulsion does not achieve the results of this invention. Addition of excess soap results in a crumb much coarser and larger than the crumb produced by my method. If the emulsion is produced through the use of a wetting agent alone, without soap, addition of excess wetting agent will again produce a large lump, not a fine crumb.

The preferred wetting agents are of the sulfonic acid type. Either an alkyl benzene sulfonate salt with from 10 to 20 carbon atoms in the alkyl group or an aliphatic naphthalene sulfonate salt with from 1 to 3 carbon atoms in the aliphatic group may be used as satisfactory wetting agents. The most satisfactory wetting agent was found to be sodium alkyl naphthalene sulfonate with from 1 to 3 carbon atoms in the alkyl group. The wetting agent may be added at a time prior to or after the complete polymerization of the butadiene and styrene or butadiene and acrylonitrile, but before coagulation, or it may be introduced concurrently with the soap used to form the original emulsion.

Other examples of wetting agents which may be used are:

Sodium isopropyl naphthalene sulfonate;
Sodium alkyl benzene sulfonate (mixed 10 to 20 carbons in alkyl group);
Decylbenzene sodium sulfonate;
Dodecylbenzene sodium sulfonate.

After the addition of the wetting agent and the complete polymerization, the latex is coagulated with a suitable coagulant such as 15–30% dilute hydrochloric acid or an alcohol.

An example of the process utilizes the following proportions of ingredients:

| | Parts by weight |
|---|---|
| Butadiene | 75 |
| Styrene | 25 |
| Potassium persulfate | 3 |
| 10% soap solution | 112 |
| Cyclohexane | 5½ |
| Sodium hydroxide | ½ to 5 |

The reacting ingredients are processed in the following manner: a soap solution may be made by adding 10% by weight of soap to warm water and agitating vigorously until the soap has been completely dissolved and the solution cooled. To this is added the styrene, free from inhibitor, and the mixture is again agitated vigorously for about 10 minutes. Then the sodium hydroxide, potassium persulfate and cyclohexane are added together and agitated for about 15 minutes to form an emulsion. If desired the wetting agent may be added at this time. The emulsion is pumped into a pot equipped with an efficient agitator and built to withstand the required pressure. The butadiene is then added and the mixture agitated and heated to 40° C. until the reaction pressure, which originally rises to 45 lbs. per square inch, drops to zero. At the completion of this time a white liquid is obtained which may be designated a latex milk.

The proportion of styrene and butadiene may be varied, but normally the ratio of butadiene to styrene is between the limits of 3:1 and 1:3. Derivatives of styrene may be employed to replace the styrene in whole or part. Other olefinic materials such as acrylonitrile may also be employed.

The resulting product is substantially free from dimers.

The milky latex so obtained is treated with a small proportion, preferably from 0.5 to 5% of an antioxidant, such as phenyl-B-naphthylamine. If the wetting agent has not been previously added, it may now be included. The wetting agent is added in either manner hereinbefore described in an amount which ranges from 1.0% to 1.5%. The figure 1.00% is critical since it has been found that the addition of a wetting agent in any lesser amounts produces large lumps or one solid lump. The addition of a wetting agent in excess of 1.5% apparently has no beneficial or deleterious effects on the desired fine-crumb size. Hence, for economy reasons, the upper limit is 1.5%. If this process is followed, crumbs having a diameter of from .5 mm. to 3 mm. are produced, having the advantages hereinbefore set out.

The latex which has been treated with the addition of the wetting agent is then added to an equal volume of dilute hydrochloric acid (15–30°) or an alcohol while undergoing violent agitation, thereby causing coagulation of the copolymerizate into the form of small white particles having rubber-like qualities.

Numerous experiments show that a fine crumb can be produced only with certain particular wetting agents. For example, the following wetting agents were not satisfactory:

Sulfated octadecanoic acid;
Oxygenated lauric acid;
Sodium lauryl sulfate;
Sodium naphthalene sulfonate;
Sodium isobutyl naphthalene sulfonate;
Sodium oleyl sulfate;
Polyoxyalkylene derivative of sorbitan monolaurate;
Polyoxyalkylene derivative of sorbitan monopalmitate;
Polyoxyalkylene derivative of sorbitan monostearate.

After the coagulation has been completed, it is desirable to neutralize the product in order to eliminate the soap which coagulates along with the copolymers, and to eliminate the hydrochloric acid which adheres to the particles.

This is done by placing the coagulated rubber-like particles into a solution of 1% to 10% sodium hydroxide or potassium hydroxide under violent agitation, the volume of the hydroxide solution being approximately equal to that of the rubber-like particles.

The rubber-like material is then freed from soap and excess alkali. This is preferably done by treatment in kneaders which are steam heated open-top vessels equipped with revolving arms. The arms are mounted in oppositely rotating groups. The top of the kneader is covered with a fine mesh which will not permit rubber to pass through, and a connection is provided in the bottom into which water is forced through the coagulate until the latter has been washed completely free of soap and excess alkali. Water is then drained off and the copolymer dried in the kneader under agitation.

The same process of coagulation is employed with the copolymerization of butadiene with acrylonitrile or derivatives thereof, or of styrene.

The use of the added wetting agent for some reason produces a coagulate which is considerably finer and more uniform in texture and size than was previously the case. The ordinary coagulate is in the form of large irregular lumps. These lumps entrap considerable quantities of uncoagulated latex and also make it difficult to complete neutralization in washing.

The use of hydrochloric acid or alcohol simplifies the process of coagulation since it eliminates the operation called "creaming" formerly employed in copolymerization.

The use of the kneader for washing produces a better washed product because it retains the coagulate in the form of fine particles which are freely suspended, whereas in former processes the particles were squeezed together on a mill. It also avoids transferring the material during washing or between washing and drying.

It is possible with the finely divided crumbs produced by this process to wash out almost all the soap used in the original emulsion. Heretofore artificial rubber products have had large percentages of the soap remaining, thereby reducing the wearing qualities of the product.

The foregoing detailed description has been given for clearness of understanding only, and no unnecessary limitations should be understood therefrom.

I claim:

1. In a method for making a fine-crumb, rubber-like copolymerizate from an aqueous emulsion of butadiene and a material copolymerizable therewith of the class consisting of styrene and acrylonitrile wherein the emulsion is formed by mixing with the butadiene and the material water and soap in an amount necessary to form the emulsion, the step which comprises coagulating the copolymerizate in the presence of from 1.0 to 1.5% by weight of the emulsion of a wetting agent of the class consisting of an alkyl substituted benzene sulfonate salt of an alkali metal having from 10 to 20 carbon atoms in the alkyl group and an alkyl substituted naphthalene sulfonate salt of an alkali metal having from 1 to 3 carbon atoms in the alkyl group.

2. The method of claim 1 in which said wetting agent is added to the emulsion prior to the copolymerization of the butadiene and the material.

3. The method of claim 1 in which said wetting agent is added to the emulsion after the copolymerization of the butadiene and said material.

4. In a method for making a fine-crumb, rubber-like copolymerizate from an aqueous emulsion of butadiene and a material copolymerizable therewith of the class consisting of styrene and acrylonitrile wherein the emulsion is formed by mixing with the butadiene and the material water and soap in an amount necessary to form the emulsion, the step which comprises coagulating the copolymerizate in the presence of from 1.0 to 1.5% by weight of the emulsion of an alkyl substituted naphthalene sulfonate salt of an alkali metal having from 1 to 3 carbon atoms in the alkyl group.

5. The method of claim 4 wherein the salt is the sodium salt of alkyl naphthalene sulfonic acid.

6. In a method for making a fine-crumb, rubber-like copolymerizate from an aqueous emulsion of butadiene and a material copolymerizable therewith of the class consisting of styrene and acrylonitrile wherein the emulsion is formed by mixing with the butadiene and the material water and soap in an amount necessary to form the emulsion, the step which comprises coagulating the copolymerizate in the presence of from 1.0 to 1.5% by weight of the emulsion of an alkyl substituted benzene sulfonate salt of an alkali metal having from 10 to 20 carbon atoms in the alkyl group.

7. The method of claim 6 wherein the salt is the sodium salt of alkyl benzene sulfonic acid.

CHARLES HENRY HEMPEL.

References Cited in the file of this patent

UNITED STATES PATENTS

| Number | Name | Date |
| --- | --- | --- |
| 2,300,056 | Meis et al. | Oct. 27, 1942 |
| 2,378,732 | Semon et al. | June 19, 1945 |
| 2,385,172 | Vanderbilt et al. | Sept. 18, 1945 |
| 2,386,764 | Zwicker | Oct. 16, 1945 |
| 2,446,115 | Svendsen | July 27, 1948 |
| 2,467,053 | Rumbold | Apr. 12, 1949 |
| 2,579,908 | Davison et al. | Dec. 25, 1951 |